United States Patent [19]

Therrien et al.

[11] Patent Number: 4,618,254
[45] Date of Patent: Oct. 21, 1986

[54] AUTOMATIC LIGHT CONTROL SYSTEM

[75] Inventors: Roger H. Therrien, Waterloo; Maninderpal S. Chahal, Kitchener, both of Canada

[73] Assignee: NCR Canada Ltd, Mississauga, Canada

[21] Appl. No.: 435,014

[22] Filed: Oct. 15, 1982

[51] Int. Cl.[4] ............................................. G03B 27/78
[52] U.S. Cl. ...................................... 355/68; 358/213
[58] Field of Search ............... 358/209, 211, 212, 213, 358/214, 215, 216, 217, 225, 54, 227, 228, 102, 280; 355/68, 14 E, 10, 69

[56] References Cited

U.S. PATENT DOCUMENTS

| | | | |
|---|---|---|---|
| 3,996,494 | 12/1976 | Suga | 315/151 |
| 4,017,180 | 4/1977 | Yen et al. | 355/68 |
| 4,024,426 | 5/1977 | Bachur | 315/151 |
| 4,093,375 | 6/1978 | Griesch et al. | 355/68 |
| 4,093,376 | 6/1978 | Rabindran et al. | 355/68 |
| 4,215,930 | 8/1980 | Miyakawa et al. | 355/14 D |
| 4,382,267 | 5/1983 | Angle | 358/213 |
| 4,408,231 | 10/1983 | Bushaw et al. | 358/280 |
| 4,423,436 | 12/1983 | Kimura | 358/98 |

FOREIGN PATENT DOCUMENTS 1590770 6/1981 United Kingdom .

OTHER PUBLICATIONS

D. A. Van Hook, "Uniform Illumination Control for Flourescent Lamps" IBM Tech. Dis. Bul., vol. 24, No. 3, Aug. 81, pp. 1650-1651.

Primary Examiner—Robert G. Lev
Attorney, Agent, or Firm—Wilbert Hawk, Jr.; Albert L. Sessler, Jr.; Richard W. Lavin

[57] ABSTRACT

A system is disclosed for automatically controlling the light intensity of a light source as a function of the amount of light received by a photosensor. In a preferred embodiment the light source illuminates a reference background which, in turn, reflects the light incident thereon to a photosensor in a video camera. In response to this reflected light, the photosensor produces a video signal which is proportional to the amount of light reflected thereon. A first processor is responsive to the reception of the video signal over a preselected period of time and provides a first signal which is proportional to the amount of reflected light received by the photosensor over that preselected period of time. A second processor is responsive to the first signal and generater a control signal to automatically cause an adjustable power supply to change the voltage applied to the light source as a function of the amplitude of the control signal. The second processor is also controlled by a sensor signal initiated by the presence of the object to be copied.

2 Claims, 3 Drawing Figures

AUTOMATIC LIGHT CONTROL SYSTEM

BACKGROUND OF THE INVENTION

1. Field of the Invention

This invention relates to light control systems for video cameras and more particularly to an automatic light control system for controlling the intensity of a light source as a function of the light reflected from a reference background onto a photosensor in a video camera.

2. Description of the Prior Art

There are two basic types of prior art, optical imager devices and systems for controlling the light reflected thereon. Such optical imagers include exposure meters, photographic cameras, video cameras, document scanners and other image pickup devices.

The first prior art type of optical imager changes the exposure time as an inverse function of the amount of light received by a photosensor in or associated with the optical imager. For example, the exposure time would be made longer for low-light reception or made shorter for high-light reception.

There are several disadvantages to the use of this first prior art type of optical imager. In industrial applications, such as in material processing where objects may be moving past an optical imager, the exposure time could not be changed without changing the speed at which the objects are moving past the optical imager. It is not feasible to do this because jams in a moving production line may result from such variable speeds. Also, in industrial applications the throughput, or production rate, would decrease because some people working along a moving production line could not keep up with a variable-speed production line.

Typical prior art devices and systems for controlling the exposure time of optical imagers are described in U.S. Pat. Nos. 3,717,077; 3,741,088; 3,944,816; 4,174,528 and 4,176,955.

The second prior art type adjusts the iris of the optical imager to increase or decrease the light forming on a photosensor in the optical imager in accordance with the operating requirements of the optical imager.

There are several disadvantages to the use of this second prior art type of optical imager. A change in the iris changes the depth of focus of the optical imager. It also changes the resolution of the optical imager.

Typical prior art devices and systems for changing the iris of the optical imager are described in U.S. Pat. Nos. 4,050,085 and 4,300,167.

In effect, each of the above-described types of prior art optical imagers compensates for the light intensity on an object being imaged by changing the incident light on the photosensor of the optical imager (by changing either the exposure time or the iris setting).

Thus, neither prior art type of optical imager teaches or even suggests a system and method for utilizing the output of the photosensor to automatically control the light intensity of a light source as a function of the incident light on the photosensor.

SUMMARY OF THE INVENTION

Briefly, an automatic light intensity control system is provided for controlling the light intensity of a light source as a function of the amount of light received by a photosensor.

In a preferred embodiment of the invention, light from a light source is reflected from a reference background onto a photosensor in a video camera to enable the photosensor to produce a video signal which is proportional to the amount of light reflected thereon. After receiving the video signal over a preselected period of time, a first means provides a first signal. In response to the first signal a second means generates a control signal to automatically cause an adjustable power supply to change the voltage applied to the light source as a function of the amplitude of the control signal.

It is, therefore, an object of this invention to provide an improved system and method for automatically adjusting the lamp intensity of a video camera.

Another object of this invention is to provide a system and method for automatically controlling the intensity of a light source as a function of the amount of light received by a photosensor.

Another object of this invention is to provide a system and method for automatically controlling the light intensity of a light source as the intensity of light received by a photosensor tends to deteriorate due to dust accumulation in the optics of the system or to the aging of the light source.

A further object of this invention is to provide a system and method for automatically controlling the light intensity of a light source as a function of the amount of light from the light source that is reflected from a reference background onto a photosensor of a video camera and for providing an indication when the light source is getting weak.

BRIEF DESCRIPTION OF THE DRAWING

These and other objects, features and advantages of the invention, as well as the invention itself, will become more apparent to those skilled in the art in the light of the following detailed description taken in consideration with the accompanying drawings wherein.

DESCRIPTION OF THE PREFERRED EMBODIMENT

Before discussing the drawings, it should be noted that the invention could be used in a wide variety of applications. More specifically, some applications in which the invention could be used are: a projector system for an outdoor drive-in movie, a universal product code (UPC) scanner in a supermarket, film development equipment in photographic studios, lighting control equipment for security areas, postal sorting equipment, processing equipment for credit card slips, X-ray equipment, surface inspection equipment to detect flaws, color measurement equipment to detect different colors based on the different light reflectivities associated with those different colors, electron microscopes, computer equipment for generating output microfiche, facsimile, optical character recognition equipment, equipment for reading bar codes, robotics, hot steel inspection equipment, vegetable processing equipment and calibrate control equipment.

In some of the above-listed applications, moving objects are sequentially scanned or imaged, while in other ones of these applications a stationary object is scanned or imaged. Whether a moving or a stationary object is to be scanned or imaged, the basic purpose of the invention is to automatically adjust the light intensity of a light source as a function of the output of the scanner or imager when no object is present before the scanner or imager. To accomplish this purpose, the light intensity of the light source can be adjusted each time that the equipment is turned on and power is applied to the equipment and no object is present, or it can be adjusted each time that no object is being scanned or imaged during the normal operation of the equipment.

Figure 1:
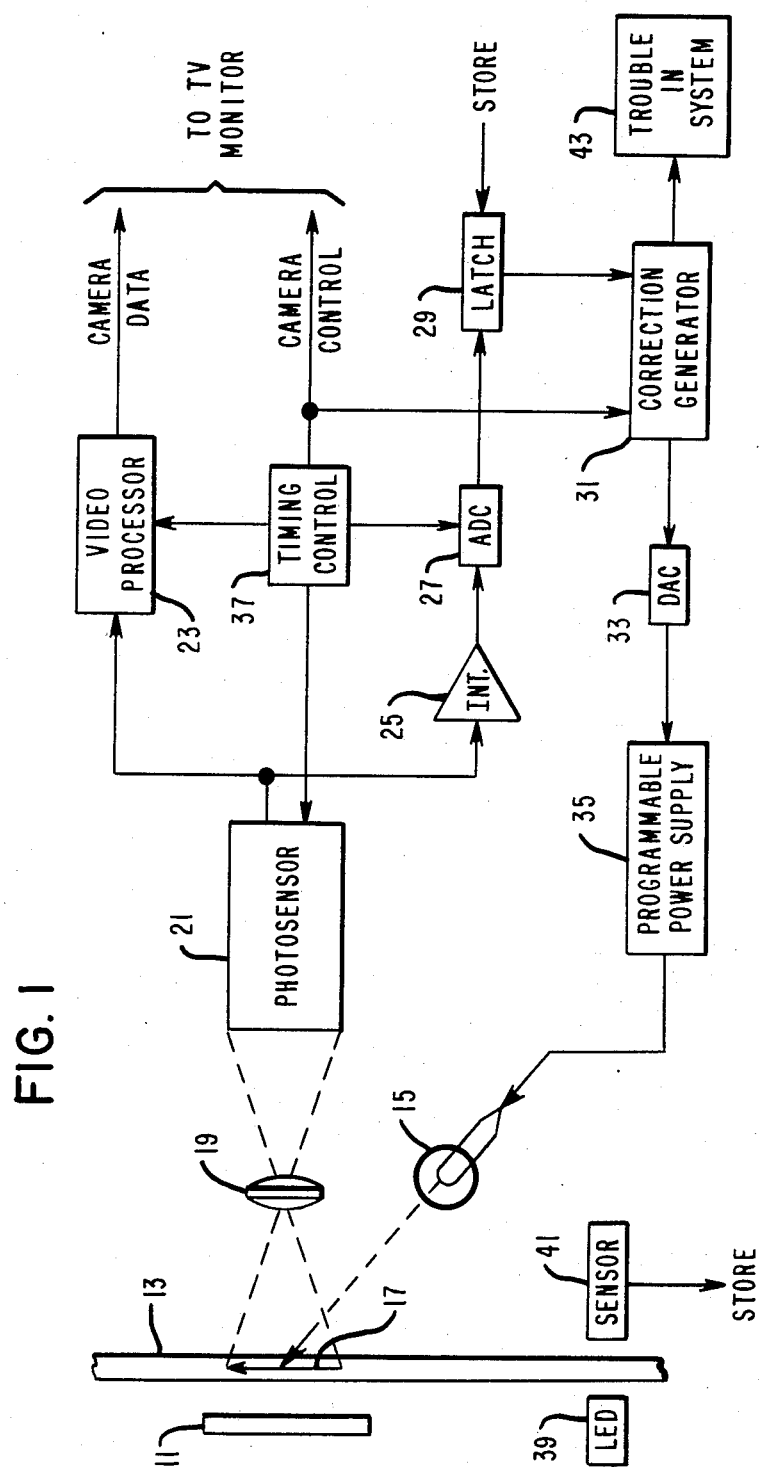
FIG. 1 is a schematic block diagram of a preferred embodiment of the invention.

Referring now to the drawings, FIG. 1 discloses a schematic block diagram of a preferred embodiment of the invention. More specifically, the invention is shown in a video camera environment or application for scanning information from moving objects. Means are shown, as explained below, for automatically adjusting the lamp intensity of a video camera each time that no object is being scanned.

In the normal imaging of an object, the following operation occurs. A reference or reference background 11, which is preferably white in color, is mounted near or adjacent to a moving track, moving conveyer line or rotating drum 13. When no object is present, the reference background 11 is illuminated by light from a suitable light source or lamp 15. As will be seen, this reference background 11 is used by the system of the invention for contrast purposes to establish and help maintain the maximum or 100% light intensity level that is available from the light source 15 for imaging objects.

An object or document 17 to be imaged can be either stationary or transported by the moving track, moving conveyer line or rotating drum 13 along a path between the reference background 11 and a lens assembly 19. As the object 17 is moved across the reference background 11, it is illuminated by the light source 15. A reflected optical image of the object 17 is focused by the lens assembly 19 onto the face of an imaging sensor or photosensor 21.

The photosensor 21 can be any photosensitive device that is capable of converting the reflected light, or optical image, incident thereon into a video signal or analog electrical voltage or current signal which is proportional to the brightness of the reflected light received. For example, the photosensor 21 could comprise an array of photodiodes, a vidicon tube, a photoarray, a storage tube, a storage oscilloscope type tube, a charge coupled device or array, or it could even be a single sensor that is moved very quickly to perform a line scanning operation.

The image of the moving object 17 is scanned by the photosensor 21 to produce an output video signal corresponding to the received optical image. This output video signal from the photosensor 21 is processed by a video processor circuit 23 to develop camera data which, for example, can be displayed on a monitor (not shown).

The output video signal of the photosensor 21 is also continuously integrated by an integrator 25 to develop an analog information signal that is proportional to the average amount of reflected light received by the photosensor 21. This analog information signal is converted to a parallel-formatted, digital information signal by an analog-to-digital converter (ADC) 27 before being applied to the input of a latch circuit 29. Latch circuit 29 may comprise a plurality of D-type flip flops for respectively receiving in parallel the bits of the parallel-formatted digital information signal. However, this digital information signal cannot be stored in the latch circuit 29 until the latch circuit 29 is enabled by a STORE signal.

Whatever digital information signal that was stored in latch 29 by the previous STORE signal is applied to a correction generator circuit 31 to enable the circuit 31 to generate a control signal. The circuit 31 can be a microprocessor which compares the digital information signal to an internal (or external) reference value to compute the amplitude of the control signal. The circuit 31 can also be a programmable read only memory (PROM) or a programmable logic array, which is addressed by the digital information signal to output an associated digital control signal, or it can be any other suitable circuit for developing a control signal as a function of the amplitude of the digital information signal.

The digital control signal is converted to an analog control signal by a digital-to-analog converter (DAC) 33. An analog programmable power supply 35, such as a Lambda or Kepco power supply, is responsive to the analog control signal for changing or maintaining the voltage that it applies to the light source 14 as a function of the amplitude of the analog control signal. The voltage applied to the light source 14 is preferably an alternating current (AC) voltage.

A timing control circuit 37, comprised of a clock generator and count down circuits (not shown), provides a plurality of timing signals to the photosensor 21, video processor circuit 23, analog-to-digital converter 27 and correction generator circuit 31 for controlling the operations thereof. Such timing operations are conventional in nature and need not be further discussed.

As the moving object 17 is being scanned or optically imaged by the photosensor 21, the object 17 moves further and further away from the leading or front edge of the reference background 11, thereby uncovering more and more of the reference background 11. When the reference background 11 is fully uncovered (no object 17 present), the background 11 is fully illuminated by the light from light source 15. Light reflected from the reference background 11 is focused by the lens assembly 19 onto the face of the photosensor 21.

It should be noted at this time that the integration time constant (resistance-capacitance time constant) of the integrator 25 has been chosen such that the integrator 25 output settles down within a relatively short period of time between consecutive objects being imaged. As a result, the output of the integrator 25, as well as the digital information signal from the ADC 27 that is being applied to the input of the latch circuit 29, has stabilized before another object 17 starts approaching the reference background 11. The stabilized digital information signal is therefore proportional to the average amount of reflected light that the photosensor 21 receives from the reference background 11 during the period of time that the reference background 11 is uncovered or not covered by an object.

As the next object to be imaged moves down the track or conveyer line 13, it passes between a light emitting diode (LED) 39 and a sensor 41 which are respectively positioned on opposite sides of the track or conveyor line 13 and downstream from the reference background 11. The passage of this next object 17 between the elements 39 and 41 interrupts the light path between the LED 39 and sensor 41, causing the sensor 41 to develop a "STORE" signal. On the leading or falling edge of this "STORE" signal, latch 29 stores the now stabilized digital information signal from the ADC 27. As discussed before, this newly-stored digital information signal is used by the generator circuit 31 to generate a control signal which is digitized by the DAC 33 and applied to the programmable power supply 35. In response to the control signal, the power supply 35 controls the voltage that it applies to the light source 15, and hence the light intensity of the light source 15, as a function of the amplitude of the control signal applied thereto. For example, if the presently applied control signal is equal in amplitude to the preceding control signal, the amplitude of the output voltage of the power supply 35, as well as the light intensity of the light source 15, will not be changed. On the other hand, if the presently applied control signal has increased or decreased in amplitude from that of the preceding control signal, the amplitude of the output voltage of the power supply, and hence the light intensity of the light source 15, will change as a function of the amplitude of the control signal. In both cases the net effect is that the intensity of the incident light on the photosensor 21 will be substantially stabilized at a constant level of intensity, regardless of, for example, such detrimental factors as a dirty reference background 11, aging of the light source 15, changes in primary power and degradations of dust accumulation in the system.

With the above-described operation, the amplitude of the camera data from the video processor circuit 23 would be maintained. Hence, an operator viewing a monitor (not shown) to which the camera data is applied could not ordinarily tell when, for example, an aging light source 15 or defective photosensor 21 may need to be replaced before it completely fails. To provide an early warning of any such deteriorating condition, the output control signal is also applied to a "trouble in system" unit 43, which may be a warning light, a buzzer or any other desired indication of trouble in the system. Such indication of trouble would occur when the amplitude of the control signal exceeded a predetermined level. An excessively large amplitude of control signal would cause the power supply 35 to apply an excessively large voltage to the light source 15. By providing an early warning of possible trouble in the system, a technician would usually have time to correct the problem before the system failed.

For those applications where a stationary object, rather than a moving object, is to be imaged, certain modifications can be made in the circuitry of the Figure. The track or conveyor line 13, the LED 39 and the sensor 41 could be eliminated. Here again the automatic adjustment of the light intensity of the light source 15 could be done when the equipment is first turned on or in between stationary objects to be imaged. A "STORE" signal could be generated a preselected period of time after the equipment is turned on. Such a delayed STORE signal could be generated by means of a fixed time delay circuit (not shown) in, for example, the timing control circuit 37 or generator circuit 31, or even associated with the power supply 35 or primary power source (not shown). Where it is desired to make the light intensity adjustments between objects, the STORE signal could be derived by, for example, the movement of an object to be imaged through a light interrupting means such as the LED 39 and sensor 41 or over a microswitch coupled across a fixed voltage.

Figure 2A:
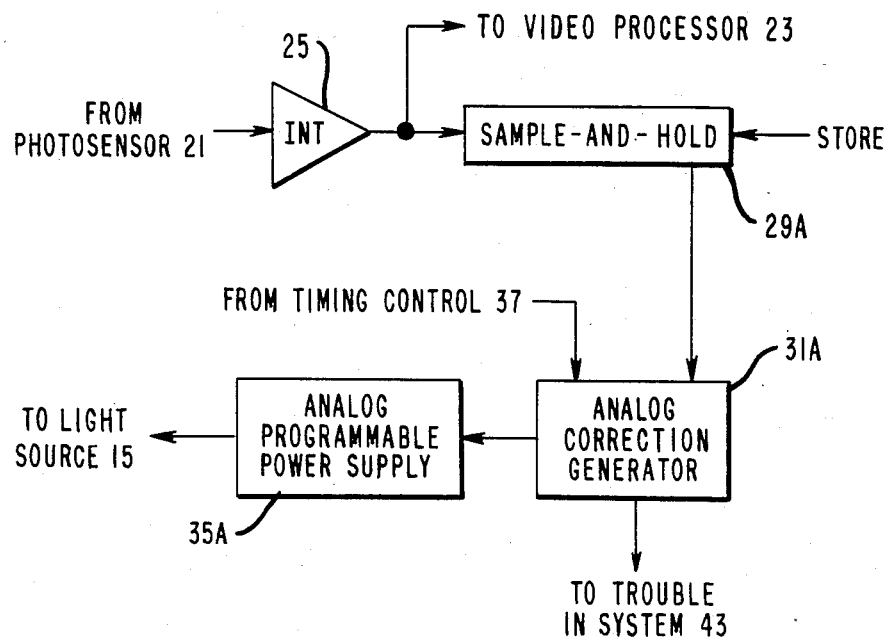
FIGS. 2A and 2B illustrate exemplary portions of the preferred embodiment illustrated in FIG. 1 that can be modified in conformance with the invention.
Figure 2B:
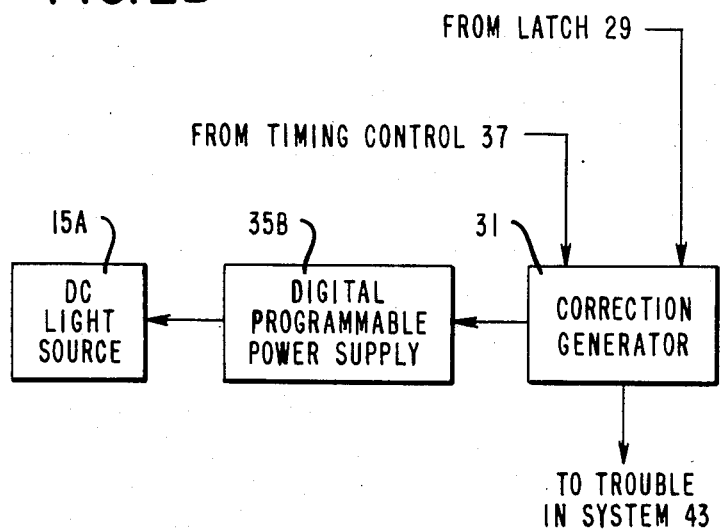

In other modifications of the invention, other changes could be made within the purview of the invention. In one such modification, as shown in FIG. 2A, the ADC 27 and DAC 33 are eliminated, the latch 29 replaced by a sample-and-hold circuit 29A which samples the integrator 25 output at the time of the STORE signal, and the generator circuit 31 is replaced by an analog correction generator circuit 31A which produces an analog control signal which is directly applied to an analog programmable power supply 35A. In another such modification, as shown in FIG. 2B, the DAC 33 is eliminated and the digital control signal from the circuit 31 could be directly applied to a digital programmable power supply 35B which, in turn, could apply a direct current (DC) voltage to a DC (direct current) light source 15A. Such digital programmable power supplies are also manufactured by Lambda and Kepco. In a further modification, if the objects or documents to be sequentially imaged all have a front or leading edge of the same color, the reference background 11 could be eliminated and those front or leading edges could be used as a reference background to adjust the intensity of the light source 15.

The invention thus provides a system and method for automatically controlling the intensity of a light source as a function of the amount of light reflected from a reference background onto the face of a photosensor.

While the salient features of the invention have been illustrated and described, it should be readily apparent to those skilled in the art that many other changes and modifications can be made in the system and method of the invention presented without departing from the spirit and true scope of the invention. Accordingly, the present invention should be considered as encompassing all such changes and modifications of the invention that fall within the broad scope of the invention as defined by the appended claims.

We claim:

1. An automatic light intensity control system for a light source located adjacent a pathway along which an object having a light reflecting surface is moved, said system comprising:

a reference background located adjacent the pathway for reflecting light impinging thereon from the light source;

sensing means positioned adjacent the pathway and adapted to output a first control signal upon movement of an object along said pathway before it reaches said reference background;

a photsensor positioned adjacent said pathway, a lens for focusing light reflected from said reference background or from the surface of said object onto said photosensor, said photosensor being responsive to this focused reflected light for producing an electrical signal which is proportional to the reflected light received from the reference background or the light reflecting surface of the object;

an integrator coupled to said photosensor for averaging the electrical signal received from said photosensor over a preselected period of time to develop a first analog signal;

an analog-to-digital converter coupled to said integrator for converting the first analog signal into a first digital signal;

a storage member coupled to said analog-to-digital converter and said sensor means, said storage member enabled by said first control signal to store the first digital signal outputted by said analog-to-digital converter thereby terminating the preselected period of time;

means coupled to said storage member for comparing the first digital signal with a digital reference signal to generate a second digital signal;

a digital-to-analog converter coupled to said comparing means for converting the second digital signal into a second analog signal;

and an analog programmable power supply coupled between said light source and the digital to analog converter for receiving such second analog signal enabling the power supply to change the voltage applied to the light source as a function of the amplitude of the second analog signal.

2. The system of claim 1 which further includes indicating means coupled to said comparing means for receiving said second digital signal whereby said indicating means generate a signal indicating that the light source is weak when the amplitude of the second digital signal exceeds a predetermined level.

* * * * *